Figure 1:
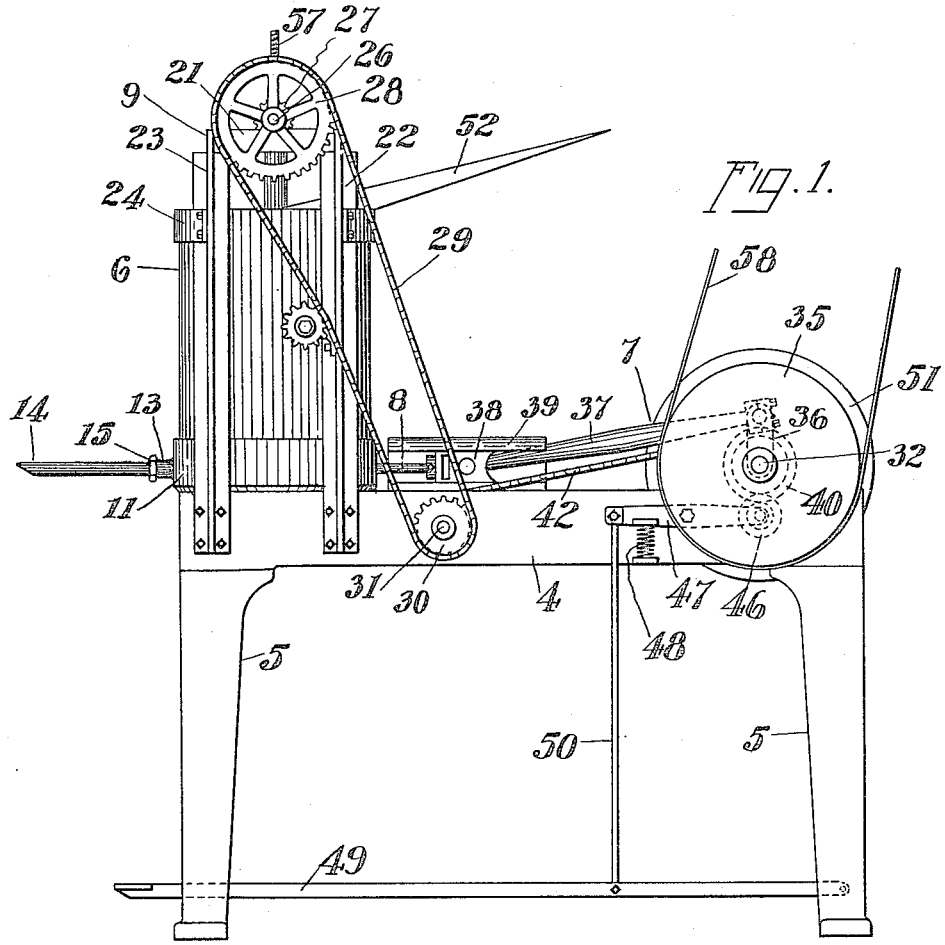

J. D. RANDALL.
HORSE COLLAR STUFFING MACHINE.
APPLICATION FILED DEC. 7, 1914.

1,151,714.

Patented Aug. 31, 1915.
2 SHEETS—SHEET 1.

WITNESSES
W. Thornton Bogert
G. Garland Brown.

INVENTOR
James D. Randall
By Walter F. Murray
Atty.

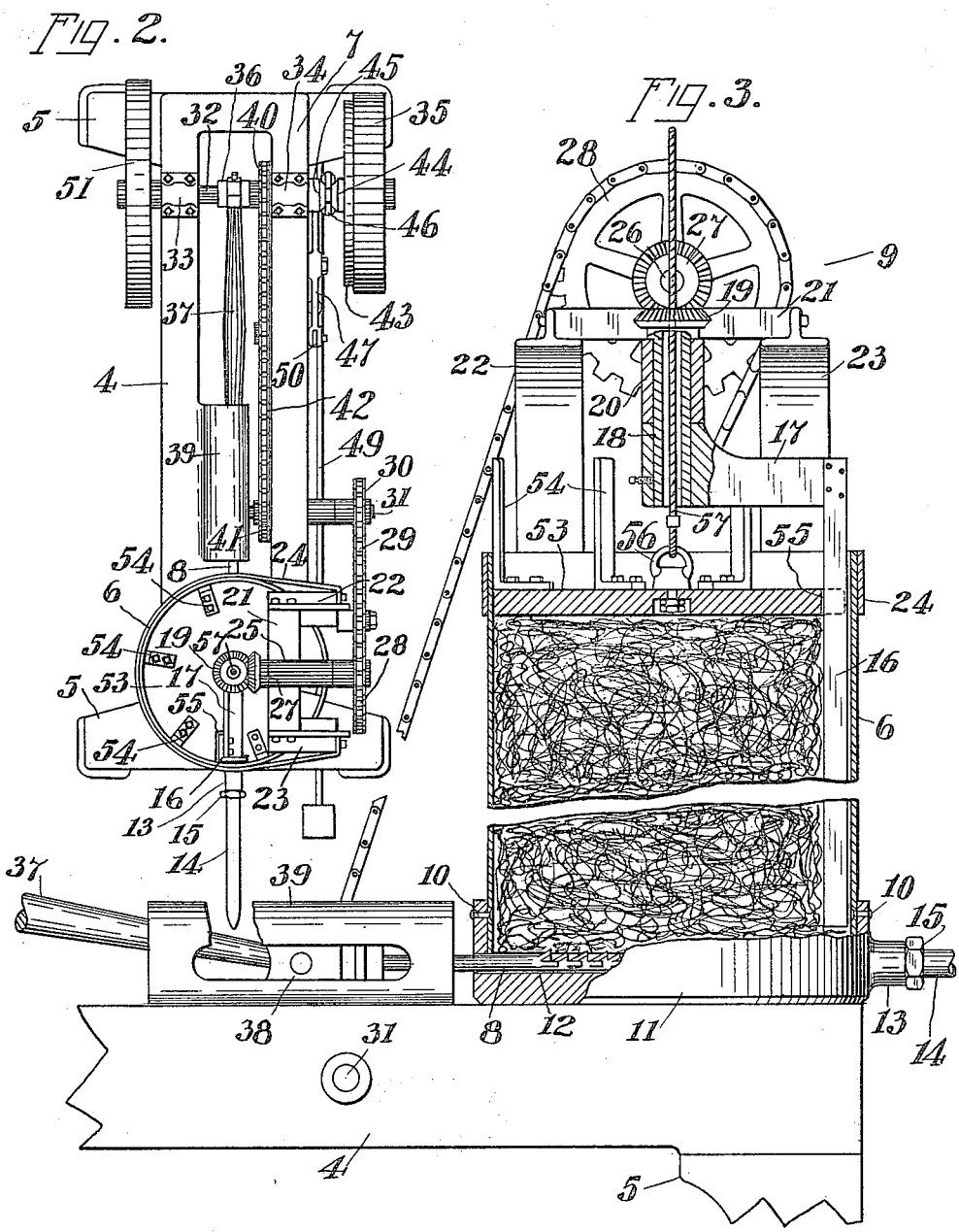

UNITED STATES PATENT OFFICE.

JAMES D. RANDALL, OF LAWTEY, FLORIDA, ASSIGNOR TO THE J. D. RANDALL COMPANY, OF CINCINNATI, OHIO, A CORPORATION OF OHIO.

HORSE-COLLAR-STUFFING MACHINE.

1,151,714.   Specification of Letters Patent.   Patented Aug. 31, 1915.

Application filed December 7, 1914. Serial No. 875,836.

*To all whom it may concern:*

Be it known that I, JAMES D. RANDALL, a citizen of the United States of America, and resident of Lawtey, Bradford county, State of Florida, have invented certain new and useful Improvements in Horse-Collar-Stuffing Machines, of which the following is a specification.

This invention relates to improvements in horse collar stuffing machines and has for an object to produce a horse collar stuffing machine of the cylindrical hopper type in which improved means are employed for agitating the straw contained in the hopper.

A further object is to produce a horse collar stuffing machine in which improved means are employed for reciprocating the stuffing rod and for rendering the operation thereof more uniform, with less expenditure of energy and with less wear upon the operating parts of the machine.

These and other objects are attained in the apparatus described in the following specification and illustrated in the accompanying drawings in which;

Figure 1 is a side elevation of a machine embodying my invention. Fig. 2 is a plan view of the machine embodying my invention. Fig. 3 is a fragmental sectional view upon an enlarged scale of certain details of a machine embodying my invention.

In machines of the cylindrical hopper class the hopper is mounted upon a base having a diametrically extending groove formed therein, in which a feed rod having teeth formed thereon is adapted to reciprocate, the teeth engaging straw at the bottom of the mass placed in the hopper, as it reciprocates and being adapted to force straw through a tube extending from the machine and into a collar casing held upon the tube. This stuffing rod, because of its rapid reciprocation, soon cuts a groove across the bottom of the mass of straw so that no more straw can be fed into the tube. For this reason the straw must be agitated as by rotating the mass within the hopper, so that fresh portions of the bottom surface of the mass will be presented to the rapidly moving teeth of the stuffing rod in order that a continuous and uniform quantity of straw will be forced through the stuffing tube and into the horse collar casing.

The object of my invention is a means for agitating the straw, which will not become clogged thereby, nor will obstruct the downward movement thereof.

The machine embodying my invention consists of a frame comprising a bed 4 suitably mounted on legs 5, with a hopper 6 mounted on the bed and located at one end thereof, a driving mechanism 7 adapted to reciprocate a stuffing rod 8 across the base of the hopper, and a mechanism 9 adapted to agitate the straw contained in the hopper during the reciprocation of the rod 8.

The hopper 6 consists of an irdinary cylindrical casing of sheet iron suitably mounted and secured as by rivets 10 on a base 11 provided on the bed 4 of the machine. The bottom of the hopper rests upon the bottom of the base 11 and the feed rod 8 is located in a groove 12 extending diametrically across the base, the groove being of such a depth that the rod occupies it with the teeth of the rod engaging the straw as it is rotated within the hopper. Extending from one side of the base at the end of the machine is a hollow boss 13 which is screw threaded at its end for the purpose of securing the usual stuffing tube 14 by means of a lock nut 15 mounted on the screw threads. The hollow boss 13 and stuffing tube 14 form a continuation of the groove 12.

In order to effect agitation of the straw I have provided a single blade 16 extending from top to bottom of the hopper, adapted to rotate around the interior thereof and to carry the straw with it as the rod 8 is reciprocated. This blade is mounted on a radially extending arm 17 which is secured to the elongated hub 18 of the bevel gear 19 mounted in a bearing 20 provided at the top of the hopper. This bearing 20 is suitably secured in position by means of the cross member 21 secured to the upright T-iron support members 22 and 23. These upright support members are secured at their lower ends to the bed of the machine as shown in Fig. 1 and are secured adjacent their upper ends to the top of the hopper by means of a band 24 as shown. The cross member 21 is also provided with a bearing 25 (see Fig. 2) in which a shaft 26 carrying a bevel gear 27 is rotatively mounted. This gear 27 is in mesh with the gear 19 whereby the arm 17 and blade 16 may be rotated when power is applied to the shaft 26.

In order to rotate the shaft 26 a sprocket 28 is provided, and in order to rotate the sprocket 28 a chain 29 passing over the sprocket 28 and a sprocket 30 mounted on a shaft 31 extending transversely of the bed 4, is also provided. The means for rotating the blade 16 and for reciprocating the stuffing rod 8 is the mechanism 7 which consists of a shaft 32 mounted in bearings 33 and 34 at the opposite end of the machine to the end carrying the hopper, a driving pulley 35 mounted on the overhanging end of the shaft 32, a crank 36 formed on the shaft 32, and a connecting rod 37 connected at one of its ends with the crank 36 and at its other end with a cross head 38 which is in turn connected with the stuffing rod 8 and reciprocally mounted in the guides 39 located on the bed 4 of the machine. Mounted on the shaft 32 is a sprocket 40 and mounted on the shaft 31 between walls of bed 4 is a sprocket 41. Passing over these sprockets is a chain 42 to enable the sprocket 40 to convey driving power from the pulley 35 to the sprocket 41 through the agency of the sprocket 40 and chain 42. Through sprocket 41, shaft 31, chain 29, sprocket 28, shaft 26, gears 27 and 19, and arm 17, blade 16 is driven and will be caused to rotate around the interior surface of the hopper. The straw contained in the hopper is rotated by this motion of the blade 16 and the rod 8 is reciprocated by the motion given the cross head by the connecting rod 37 and crank 36.

In order to start and to stop the machine I have provided a cone clutch comprising a member 43 which engages the rotatively mounted pulley 35 thereby causing the shaft 32 to rotate, the cone member 43 being splined to the shaft for this purpose. In order to effect engaging and disengaging movement of the member 43 I have provided a beveled surface 44 on the hub of the member 43 and a beveled surface 45 on a collar 46 secured to the shaft 32. Between these surfaces 44 and 45 a roller 46 having beveled edges is adapted to enter, so that the member 43 will be forced into engagement with the pulley 35. This roller 46 is mounted on the end of a pivotally mounted lever 47 which normally holds the roller 46 out of engagement with the surfaces 44 and 45 because of the action of a spring 48 engaging the lever as shown. In order to effect engagement of the roller 46 I have provided a foot treadle 49 and a rod 50 connecting the treadle and the end of the lever 47.

I have provided a fly wheel 51 on the opposite end of the shaft 32 of the loosely mounted pulley 35, for the purpose of assisting in steadying the rotation of the shaft and the reciprocation of the rod 8, in addition to absorbing excessive vibration created by the reciprocation of the cross head 38 and the rod 8. Another feature which I have added is a shield 52 which extends substantially half way around the upper end of the hopper and is inclined toward the hopper, but which projects over the operating mechanism of the machine. This shield is provided for the purpose of preventing any straw from falling into and clogging the operating parts of the machine.

In Fig. 3 I have illustrated a weight 53 located within the hopper and bearing upon the mass of straw contained therein, to force the straw into engagement with the teeth of the rod 8 when the straw is rotated by the blade 16. This weight is provided with upwardly extending guides 54 which contact with the inner surface of the hopper for the purpose of maintaining the weight in a horizontal position as it descends in the hopper. A notch 55 is cut in the edge of the weight to receive the blade 16, so that the weight will rotate with the blade and consequently rotate and descend with the mass of straw as it is used up. In order to withdraw the weight I have provided a swivel ring 56 to which a rope 57 is connected and which passes through the hollow elongated hub 18 of the gear 19, and by which the weight may be lifted when fresh straw is to be placed within the hopper. The function of the swivel ring 56 is to permit the weight to rotate without twisting the rope.

Any suitable means such as the driving belt 58 may be provided for driving the machine.

Having thus described my invention, what I claim is:

1. A horse collar stuffing machine comprising a frame, a hopper mounted on the frame, a feed rod reciprocally mounted at the base of the hopper, an agitator blade extending into the hopper, mechanism located at the top of the hopper adapted to move the agitator blade around the inner wall of the hopper, a second mechanism adapted to reciprocate the feed rod, and a driving means adapted to actuate the mechanisms.

2. A horse collar stuffing machine comprising a frame, a hopper mounted at one end of the frame, an agitator blade extending into the hopper from the top thereof and adapted to be moved around its interior surface, a feed rod extending across the bottom of the hopper and adapted to have reciprocating motion, and a mechanism mounted on the frame adapted to effect simultaneous movement of said agitator blade and said feed rod.

3. A horse collar stuffing machine comprising a frame, a hopper mounted on the frame, a feed rod located in the bottom of the hopper, means adapted to reciprocate said feed rod, an agitator blade located in said hopper and extending longitudinally of its interior surface, and mechanism adapted to move said agitator blade around the interior surface of the hopper and located adjacent to the top of the hopper, said mechanism comprising supports mounted on the frame and extending over the top of the hopper, bearings mounted on the supports, and mechanism located in the bearings adapted to communicate driving power to the agitator blade.

4. In a stuffing machine the combination of a hopper, a blade located adjacent to the inner surface of the hopper, a mechanism for rotating the blade located near the top of the hopper, and a weight adapted to fit within the hopper and to straddle the blade.

5. In a collar stuffing machine the combination of a hopper, a blade located adjacent to the inner surface of the hopper, means for agitating the blade located near the top of the hopper, a weight within the hopper and straddling the blade, a rope for lifting the weight, and a swivel connection between the rope and the weight.

In testimony whereof, I have hereunto subscribed my name this 5th day of December, 1914.

JAMES D. RANDALL.

Witnesses:
WALTER F. MURRAY,
W. THORNTON BOGERT.

Copies of this patent may be obtained for five cents each, by addressing the "Commissioner of Patents, Washington, D. C."